(12) United States Patent
McCaughan et al.

(10) Patent No.: US 6,545,791 B1
(45) Date of Patent: Apr. 8, 2003

(54) ELECTRO-OPTIC OPTICAL ELEMENTS

(75) Inventors: Leon McCaughan, Madison, WI (US); Thomas F. Kuech, Madison, WI (US); Dovas A. Saulys, Madison, WI (US); Vladimir A. Joshkin, Madison, WI (US); Aref Chowdhury, Springfield, NJ (US); Chad Matthew Staus, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 10/102,594

(22) Filed: Mar. 19, 2002

Related U.S. Application Data

(60) Provisional application No. 60/277,164, filed on Mar. 20, 2001.

(51) Int. Cl.$^7$ .............................. G02F 1/03; G02F 1/035
(52) U.S. Cl. ..................... 359/245; 359/246; 359/248; 359/237; 359/238; 359/321; 385/2
(58) Field of Search ................. 359/245, 246, 359/248, 237, 238, 254, 321; 385/2, 11, 14, 24, 37, 3, 8, 9

(56) References Cited

U.S. PATENT DOCUMENTS

| | | | |
|---|---|---|---|
| 4,940,302 A | 7/1990 | Houk et al. | 385/15 |
| 5,050,948 A | 9/1991 | Hawkins, II et al. | 385/2 |
| 5,271,957 A | 12/1993 | Wernberg et al. | 427/109 |
| 5,455,876 A | 10/1995 | Hopfer et al. | 385/2 |
| 5,548,668 A | 8/1996 | Schaffner | 385/1 |
| 5,561,549 A | 10/1996 | Hatori et al. | 359/319 |
| 5,728,603 A | 3/1998 | Emesh et al. | 438/3 |
| 5,751,867 A | 5/1998 | Schaffner et al. | 385/3 |
| 5,781,327 A | 7/1998 | Brock et al. | 359/249 |
| 5,886,807 A * | 3/1999 | Cummings | 359/245 |
| 5,956,171 A | 9/1999 | Dennis et al. | 359/281 |
| 6,069,729 A | 5/2000 | Gill et al. | 359/245 |
| 6,118,571 A | 9/2000 | Wessels et al. | 359/245 |
| 6,148,122 A | 11/2000 | Cao et al. | 385/1 |
| 6,172,791 B1 | 1/2001 | Gill et al. | 359/249 |

OTHER PUBLICATIONS

Kazuto Noguchi, et al., "A Broadband Ti:LiNbO3 Optical Modulator with a Ridge Structure," J. of Lightwave Technology, vol. 13, No. 6, Jun. 1995, pp. 1164–1168.
M. Levy, et al., "Fabrication of single–crystal lithium niobate films by crystal ion slicing," Appl. Phys. Lett., vol. 73, No. 16, Oct. 19, 1998, pp. 2293–2295.
V.A. Joshkin, et al., "Growth of oriented lithium niobate on silicon by alternating gas flow chemical beam epitaxy metalorganic precursors," Appl. Phys. Lett., vol. 76, No. 15, Apr. 10, 2000, pp. 1–3.
D. Saulys, et al., "An examination of the surface decomposition chemistry of lithium niobate precursors under high vacuum conditions," J. of Crystal Growth, vol. 17, 2000, pp. 287–301.
I.–L. Gheorma, et al., "Thin Layer Design of X–Cut LiNbO3 Modulators," IEEE Photonics Technology Letters, vol. 12, No. 12, Dec. 2000, pp. 1618–1620.
V. Joshkin, et al., "Two–stage Growth of Patterned Epitaxial Lithium Niobate for Photonic Application," IUVSTA 15th International Vacuum Congress (IVC–15), Nov. 1, 2001, abstract printed from worldwide web Oct. 30, 2001.
Kazuto Noguchi, "Millimeter–Wave Ti:LiNbO3 Optical Modulators," J. of Lightwave Technology, vol. 16, No. 4, Aug. 1998, pp. 615–619..

* cited by examiner

*Primary Examiner*—Hung Xuan Dang
*Assistant Examiner*—M. Hasan
(74) *Attorney, Agent, or Firm*—Foley & Lardner

(57) ABSTRACT

Electro-optic elements are formed in metal oxide films, such as lithium niobate, on a substrate such as lithium niobate for utilization in electro-optical devices. The electro-optic elements include trenches in the lithium niobate selected to improve the performance of the device. Traveling wave modulators may be formed with a waveguide having first and second arms, electrodes over the lithium niobate layer, and trenches formed in the layer to focus the electric field in the waveguide, resulting in improved modulator performance.

34 Claims, 9 Drawing Sheets

ELECTRO-OPTIC OPTICAL ELEMENTS

REFERENCE TO RELATED APPLICATION

This application claims the benefit of provisional application No. 60/277,164, filed Mar. 20, 2001, the disclosure of which is incorporated herein by reference.

REFERENCE TO GOVERNMENT RIGHTS

This invention was made with United States government support awarded by the following agency: NSF Grant No: 0079983 and USAF/AFOS F49620-01-00. The United States government has certain rights in this invention.

FIELD OF THE INVENTION

This invention pertains generally to the field of crystalline metal oxide films, optical elements formed of such materials, and methods of producing such materials.

BACKGROUND OF THE INVENTION

Ferroelectrics such as lithium niobate (an oxide) possess a large non-resonant second-order optical nonlinearity which makes such materials useful for fabrication of a variety of optical and opto-electronic devices. Examples include optical switches and modulators, frequency shifting devices, polarized controllers, pulsed waveguide lasers, surface-acoustic-wave filters, and acousto-optic devices. These materials also often possess additional useful properties, such as piezoelectric, elasto-optic, and pyroelectric effects. Conventionally, such devices are fabricated from the bulk crystal material (typically a wafer about 0.5 to 1 mm thick), although most devices use only a small fraction of the surface volume of the material. Because these oxides tend to be chemically very inert, there are only a very limited number of surface modification tools (e.g., thermal diffusion) that can be used for fabrication purposes. It would be desirable if it were possible to deposit thin films of the ferroelectric materials on a substrate while controlling the composition and purity of the deposited materials. It would also be desirable if it were possible to deposit the film in a form which can be easily etched or ablated, permitting the fabrication of photolithograhically defined two-dimensional and three-dimensional structures on a planar substrate.

Numerous attempts have been made to grow crystalline $LiNbO_3$ and other $ABO_3$ ferroelectrics (where A and B are other metals) on various substrates. $LiNbO_3$ thin films, for example, have been grown on semiconductors (e.g., Si and Ge), on dielectrics (e.g., MgO and $Al_2O_3$) and on ferroelectrics (e.g., $LiTaO_3$ and $LiNbO_3$ itself). In general, the objective of such deposition processes is to produce a crystalline thin film, since the crystalline form of the material usually has the best optical and electronic film qualities (e.g., optical transparency and nonlinear properties). Crystalline forms (e.g., single crystal textured, or polycrystalline) of these materials, however, etch very slowly with etchants current available. For example, a 50% aqueous solution of HF will have a negligible effect on single crystal $LiNbO_3$, and reactive ion etching (RIE) using $CCl_2F_2$:Ar:$O_2$ results in only about 3 μm/h etch rate. These etch rates are comparable to the etch rates for the masking materials that are used, making high resolution geometries essentially infeasible and resulting in very rough sidewalls with large optical losses. See J. L. Jackel, et al., "Reactive Ion Etching of $LiNbO_3$," Applied Phys. Lett., Vol. 38, 1981, pp. 970 et seq.

Among the devices that utilize $LiNbO_3$ are traveling wave electro-optic modulators. $LiNbO_3$ traveling wave modulators are currently formed utilizing a $LiNbO_3$ substrate containing a Mach-Zehnder waveguide geometry, a buffer layer (a thin dielectric film such as $SiO_2$ isolating the light in the waveguide from the metal electrodes), and metal electrodes in the form of a microwave strip line. State of the art commercial traveling wave modulators (TWMs) using these structures have a 7 GHz bandwidth (corresponding to 10 Gb/s maximum transmission rate for non-return to zero (NRZ) coding) and an operating voltage at the maximum speed of $V_\pi$@7 GHz=6 volts. At 40 Gb/s (30 GHz bandwidth, NRZ), numerical simulation shows that the conventional $LiNbO_3$ TWM requires a drive voltage of about 9 volts with an electrode length L=1.6 cm and thickness $t_e$=30 μm. However, the available gallium arsenide drive electronics at this bit rate has a maximum voltage swing of about ±4.5 volts. Thus, the conventional TWM structure would theoretically be capable of attaining the 40 Gb/s bit rate, but there is no margin of error to allow for processing variability. To account for thermal voltage degradation and process variations in the electronics, a margin of error of about 10% must be allowed (i.e., the TWM must be capable of operating at ±4 volts).

Noguchi, et al. ("A Broadband Ti:$LiNbO_3$ Optical Modulator with a Ridge Structure," J. of Lightwave Technology, Vol. 13, No. 6, June 1995, pp. 1164–1168) have shown that etching 3–4 μm deep ridges in the $LiNbO_3$ above the Mach-Zehnder waveguides produces a better overlap between the optical and microwave fields, thereby allowing the drive voltage to be reduced. However, difficulties are encountered in making commercial devices having such structures because, as noted above, the etch rates of crystalline $LiNbO_3$ are very slow. The resulting surfaces are rough, significantly increasing the waveguide's propagation loss. In addition, the reliability of devices made using present etching techniques is questionable. A variation of this approach is shown in U.S. Pat. No. 6,172,791 to Gill, et al., in which ion implantation is used to allow etching at an angle to form ridges with reentrant sidewalls to further shape the electric field in the ridges.

SUMMARY OF THE INVENTION

In accordance with the present invention, metal oxide films, in particular lithium niobate, are formed for applications in electro-optic and optical systems. The present invention may be incorporated into the fabrication of lithium niobate traveling wave modulators (TWMs) by defining topological features in the deposited lithium niobate film that allow it to function at higher bit rates than conventional devices.

A lithium niobate optical element can be formed in accordance with the invention with a substrate, such as crystalline lithium niobate, having a top surface, a layer of crystalline lithium niobate formed on the top surface of the substrate, the layer having a thickness of at least two microns, and at least one trench in the layer of lithium niobate which is at least one micron deep. The trench may be filled with a material, such as silicon dioxide, using the same mask used to define the trench, producing a region with a dielectric constant differing from that of the surrounding layer. Further, metal films may be formed over a trench filled with a low dielectric constant material such as photoresist or $SiO_2$. If desired, the low dielectric material may subsequently be dissolved (to further reduce the dielectric constant to that of air) by leaving the ends of the trench uncovered by the metal film and therefore accessible to a solvent. A travelling wave electro-optical modulator may utilize such structures by incorporating a waveguide in the layer of lithium niobate which has an input path, first and second arms that split from the input path, and an output path, the first and second arms coupled to the output path, and electrodes above the layer of lithium niobate typically arranged as a microwave stripline. Trenches are formed in the lithium niobate layer on either side or on both sides of the two waveguides and parallel to them. The depth and width of the trenches and their positions with respect to the waveguides may be selected to optimize the performance of the TWM. In particular, the trench geometries can be used to equalize the microwave and optical effective indices, $N_m - N_o = 0$, and simultaneously to maintain an acceptable electrical impedance Z~50 ohms or larger. The trenches also serve to concentrate the electric field from the electrodes, reducing the required operating voltages. The use of several trenches, each of which may have different widths (typically 2–10 $\mu$m), provides the necessary degrees of freedom to optimize these parameters even for thick electrode structures (which thus have low resistance). Unlike prior vertical walled or angled walled ridge structures, the flexibility of the trench geometry in accordance with the present invention (depth, width, position) allows broad tunability of the TWM parameters and does not require that the trenches be placed close to the waveguides (which is known to cause optical loss due to scattering).

Further objects, features and advantages of the invention will be apparent from the following detailed description when taken in conjunction with the accompanying drawings.

DETAILED DESCRIPTION OF THE INVENTION

For purposes of illustrating the invention and its application, the following describes the utilization of the invention in optical elements such as optical modulators. An optical modulator is a device that converts data from an electrical to an optical format. For high-speed optical communications (>100 Mb/s), there are basically two types of modulators in use: the electro-absorption modulator (EAM) and the electro-optic (EO) modulator. The EAM is a semiconductor-based device that absorbs light when subjected to an electric field (i.e., the quantum Stark effect). The EAM is currently deployed for fiber optic systems that operate at or below the 2.5 Gb/s rate. For higher bit rates (10 Gb/s and beyond), the EAM has several drawbacks, including: the presence of chirp (spectral broadening brought on by a change in the device's refractive index, owing to the injection of carriers), limited modulation depth, and wavelength sensitivity. The EO modulator does not have these drawbacks. However, the EO devices now fabricated in bulk $LiNbO_3$ cannot be operated at both high speeds and low voltages and with a characteristic impedance in the preferred range of 50 ohms.

Figure 1:
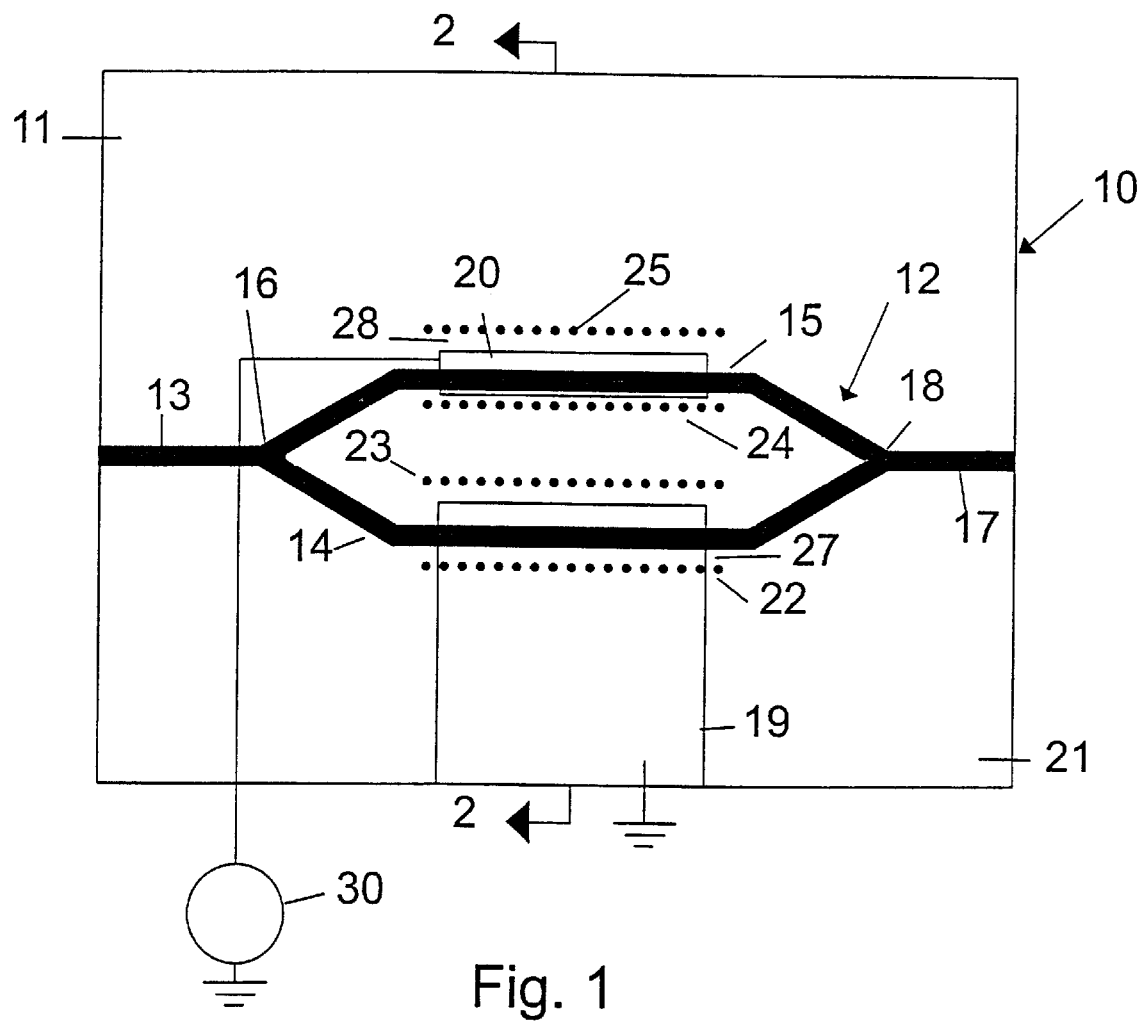
FIG. 1 is a schematic diagram of a Mach-Zehnder traveling wave modulator incorporating the present invention.
Figure 2:
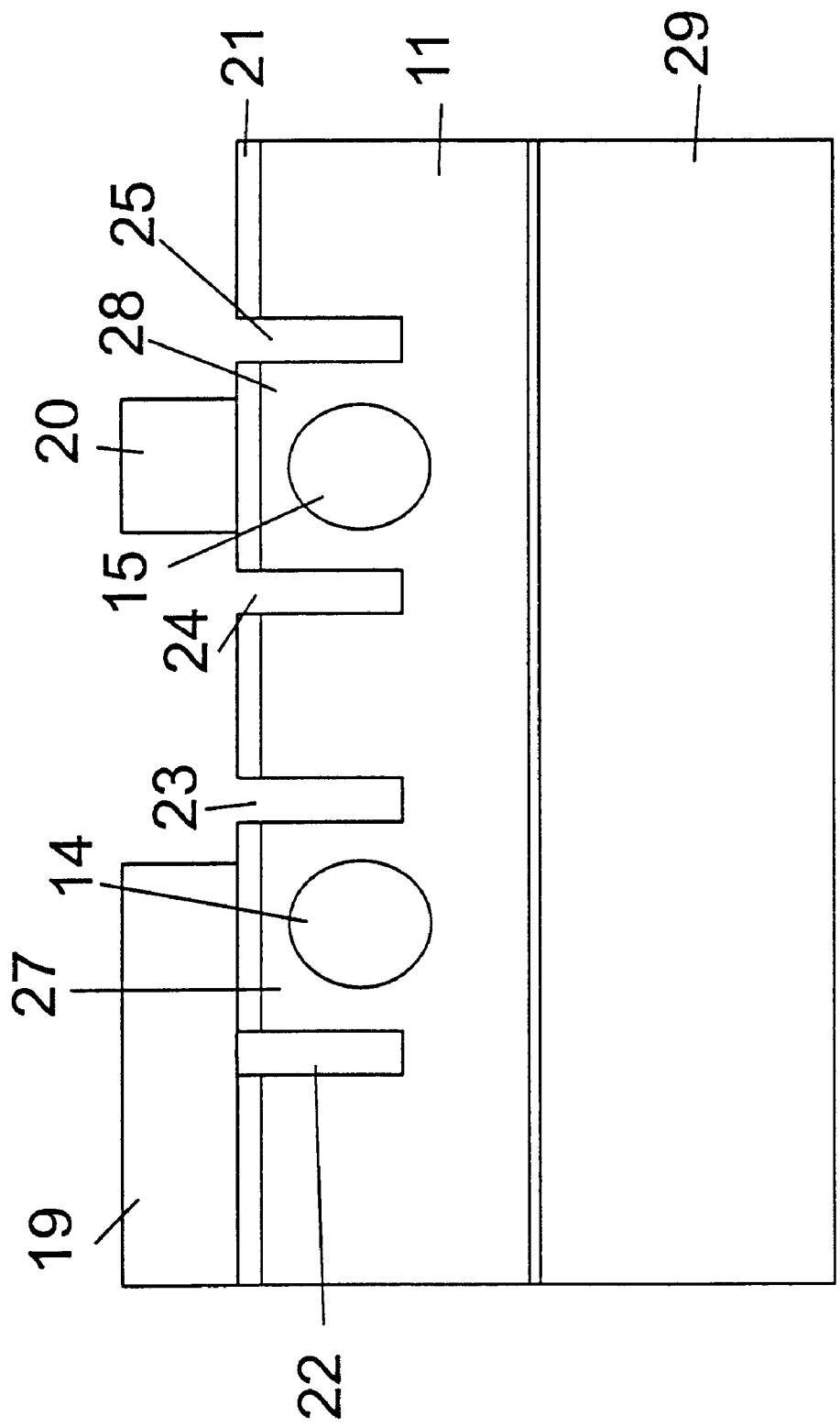
FIG. 2 is a simplified cross-sectional view of the Mach-Zehnder electro-optical modulator in accordance with the invention, taken generally along the lines 2—2 of FIG. 1.
Figure 4:
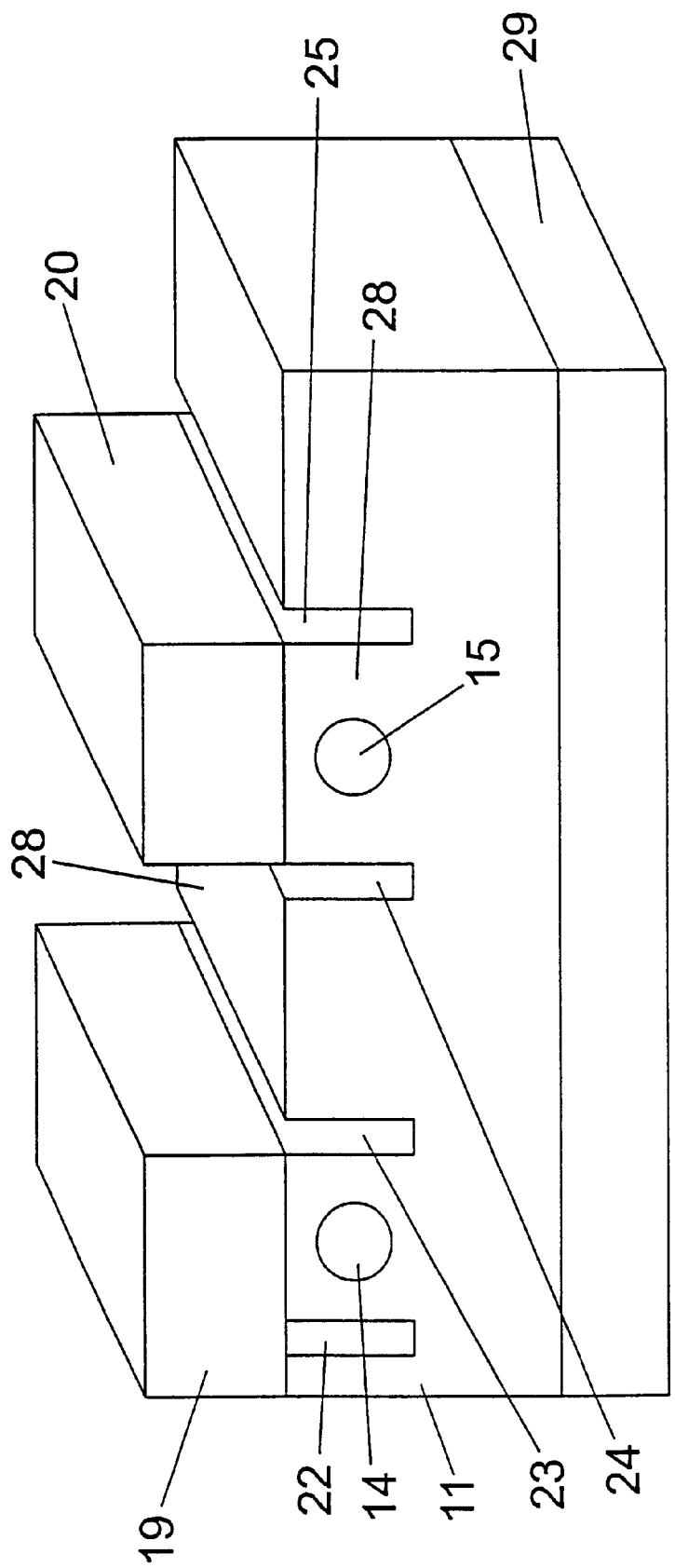
FIG. 4 is a simplified perspective view of a portion of the modulator structure of FIGS. 1–3.

The most commonly used EO modulator is based on the Mach Zehnder configuration of the type shown at 10 in FIG. 1. The modulator is formed in an electro-optical material 11 (conventionally, a substrate of single crystal lithium niobate) and includes a waveguide 12 having an input path 13, a first arm 14 and a second arm 15 that are split from the input path 13 at a splitter 16, and an output path 17 to which the first and second arms 14 and 15 are coupled at a coupler 18. Electrodes 19 and 20 are positioned to take advantage of the largest electro-optic coefficient in the material (e.g., $r_{33}$ in $LiNbO_3$). For a z-cut orientation, this corresponds to having both electrodes positioned directly above the waveguides 14 and 15, respectively. In this case, a thin (0.25–1 $\mu$m) dielectric layer 21 (e.g., $SiO_3$) is needed to isolate the electrodes 19 and 20 from the waveguides. Trenches 22, 23, 24 and 25 (which may alternatively be referred to as slots) are formed in the electro-optic material 11 in accordance with the invention to compensate for microwave/optical velocity mismatch and to improve the microwave/optical field overlap. As discussed below, the material layer 11 is preferably formed as a thin layer on a substrate 29 (e.g., single crystal $LiNbO_3$) as shown in FIGS. 2 and 4. An electrical signal from a source 30 is used to produce an electric field in one arm 15 (or both arms) of the device 10; this electric field causes a change in the refractive index of the material in the arm or arms, which produces a relative change in the phase of the two light fields entering the coupler 18. The preferred electro-optic material 11 in which the arms 14 and 15 are formed is lithium niobate, $LiNbO_3$. At high modulation rates, it is necessary that the applied electrical signal and the light in the Mach-Zehnder arm travel with near-equal or equal velocities. In order to accomplish this, the electrodes 19 and 20 take the form of microwave striplines, and this type of modulator has come to be known as the traveling wave modulator (TWM). The parameters that are generally used to judge the performance of a TWM are bandwidth, the drive voltage at the maximum frequency ($V_{3\ dB}$), characteristic impedance, modulation depth, and insertion loss. The important characteristic parameters which control these performance parameters of the TWM are the following: electrode width and height, buffer layer thickness, $\alpha_m$ (electrode loss), L (electrode length), $\alpha_0$ (microwave stripline/waveguide propagation loss), $N_m$ (microwave effective index), $N_0$ (optical effective index), Z (characteristic impedance), $\Gamma$ (the microwave/optical fields overlap), and V$\pi$ @ DC, (switching voltage at zero modulation frequency).

Such TWM devices preferably have a high bit rate at the lowest achievable drive voltage with the maximum modulation depth, and with an impedance that matches that of the drive electronics (typically 50Ω). The reality, however, is that it is very difficult to achieve all these specifications for a high-speed device. For example, one may have a device that operates at 40 Gb/s but possesses a large Vπ @ maximum bit rate ($V_{3\ dBe}$)=9V and low impedance of ~30Ω.

The present invention allows the preferred design objectives to be realized by manipulating the electro-optic material and morphological characteristics of the electro-optic material. This manipulation enables selection of both the microwave and optical properties in such a manner that all of the desired performance parameters can be simultaneously obtained. The present invention makes it possible to match the optical and microwave effective indices ($N_m=N_O$), achieve a lower operating voltage, and have the device operate at an optimum impedance (e.g., Z=50Ω), all at a desired bandwidth.

One approach to manipulation of the material and morphological characteristics is based on the ability to grow thin films of $LiNbO_3$ on a $LiNbO_3$ substrate, with various degrees of crystallinity (amorphous, polycrystalline, and crystalline), and then alter the state of their crystallinity. As an example, under the proper growth conditions, films of amorphous $LiNbO_3$ can be grown on a substrate of crystalline $LiNbO_3$. Such amorphous $LiNbO_3$ can be easily etched with conventional etchants (e.g., a 4% aqueous solution of HF will etch at a rate of >5 μm/min.). Thus, topological (morphological) features such as trenches, ridges, etc. can be defined by standard photolithographic processes and replicated in the amorphous $LiNbO_3$. Further, in accordance with the invention, this "engineered" film can be converted to a crystalline form. The electro-optic effect in $LiNbO_3$ requires the crystalline form of the material. One way to convert the amorphous $LiNbO_3$ to crystalline $LiNbO_3$ is by heating (annealing) at a high temperature (e.g., 900° C. to 1100° C.) in a lithium rich environment. Alternatively, a crystalline $LiNbO_3$ surface (e.g., the standard $LiNbO_3$ substrate) can have an amorphous film or feature formed thereon (and therefore easily etched) by implanting high-energy ions such as H, He, or oxygen. This modified surface layer can be used to fabricate some surface structures (e.g., trenches) in bulk $LiNbO_3$. As discussed further below, trenches can also be etched with a pulsed laser beam.

Figure 3:
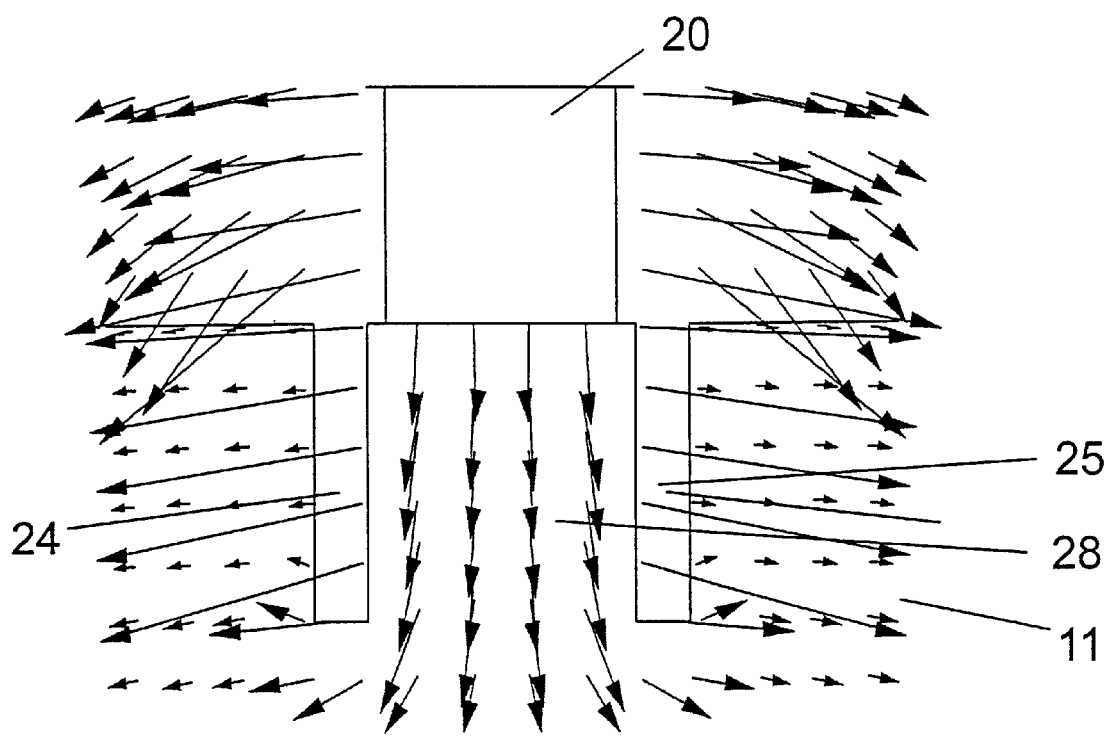
FIG. 3 is a schematic diagram of an electric field profile for a traveling wave electrode on an, e.g., lithium niobate layer into which has been etched a pair of deep trenches to define a ridge on which an electrode is formed.

As an example of the capabilities of this method, with reference to FIG. 3, a numerical simulation was made of the effect of (with reference to the type of structure shown in FIGS. 1 and 2) a pair of trenches 24 and 25, bracketing an electrode 20 of a TWM. As shown in FIG. 3, the trenches 24 and 25 are preferably spaced away from the electrode 20, preferably by at least 2 μm (from the side of the electrode to the closest side wall of the trench 24 or 25). The trenches (and thus the layer of lithium niobate) are preferably at least 5 μm deep. As can be seen from FIG. 3, the electric field emanating from the electrode 20 has been focused along the vertical direction into the region 28 between the trenches 24 and 25 (without the trenches 24 and 25, the electric field would radiate nearly omnidirectionally in the lower half-plane). This electric field confinement results in a significant increase in the microwave field/optical field overlap. Typically, the overlap increases from about 0.7 to about 1.2, about a 50% improvement. The drive voltage is reduced proportionately. In addition, selection of the size, geometry and position of the trenches permits the control of the microwave index ($N_m$), and the characteristic impedance (Z). As seen in FIG. 3, the direction of the electric field can be dramatically changed across boundaries with large differences in the dielectric constant. This suggests that the electric fields can be refracted or bent to improve the microwave/optical overlap (e.g., increasing the horizontal component of the electric field from surface electrodes on x-cut $LiNbO_3$).

As an example, a modulator in accordance with the invention having a Mach-Zehnder structure as shown in FIGS. 1–4 may be formed in a $LiNbO_3$ layer 11 on a $LiNbO_3$ substrate 29. 30 μm thick electrodes 19 and 20 are formed over the waveguide arms 14 and 15 and a 0.5 μm dielectric layer 21 that separates the conductors 19 and 20 from the layer 11. Numerical simulation of a 40 Gb/s NRZ (30 GHz BW) TWM modulator (see Table 1) with this form shows an impedance of 48Ω and a drive voltage at maximum bandwidth of $V_{3\ dBe}$=4.0 V. This is a 50% reduction in drive voltage over planar TWM structures in which typically $V_{3\ dBe}$=6.2 V.

TABLE 1

Fixed parameters
Electrode Geometry: SCPW; tb = 0.5 μm; wel = 8 μm; Gel = 34 μm
ao = 0.4 dB/Hz^½

| Function | BW | L | dxw | Γtot/Gel | Vπdc | V3dBe | Z(Ω) | ΔN/No |
|---|---|---|---|---|---|---|---|---|
| 10 Gb/s | 15 | 3.9 | 7 × 18 | 0.047 | 2.6 | 3.8 | 46 | 0.074 |
| 10 Gb/s | 16 | 6 | 9 × 28 | 0.044 | 1.8 | 2.6 | 48 | 0.028 |
| 40 Gb/s-NRZ | 30 | 3.9 | 9 × 28 | 0.044 | 2.8 | 4 | 48 | 0.028 |
| 40 Gb/s-RZ | 47 | 3.9 | 10 × 28 | 0.042 | 2.9 | 4.1 | 49 | 0.014 |
| ~60 Gb/s-RZ | 64 | 3.9 | 12 × 22 | 0.040 | 3 | 4.3 | 50 | 0.005 |

A preferred $LiNbO_3$ TWM in accordance with the invention, as discussed above, has a Mach Zehnder waveguide geometry, microwave coplanar waveguides, and an isolating layer (called the buffer layer) between them. Exemplary fabrication steps for forming such structures are as follows:

1. Deposit amorphous $LiNbO_3$ layer 11 on a substrate 29. The substrate may be $LiNbO_3$, or another material of lower (e.g., sapphire) or higher (e.g., silicon) refractive index than $LiNbO_3$. The film should be sufficiently thick to encompass an optical waveguide (e.g., ~7 μm @ 1.55 μm wavelength). Dopants may be added during growth to provide for enhanced optical or microwave features (e.g., optical gain via $Er^{3+}$ doping), or to introduce the optical waveguides, (e.g., with Ti).
2. Modify film morphology. For example, define trenches 22, 23, 24, and 25 on the film surface via photolithography.
3. Anneal (e.g., at 900°–1100° C. for several hours) to convert the remaining amorphous material layer 11 to crystalline $LiNbO_3$.
4. If necessary, pole the $LiNbO_3$ thin film 11 by applying an electric field (e.g., ~22 kV/mm for congruent $LiNbO_3$).

5. Fabricate waveguide elements 13–18. Typical methods include diffusion of Ti strips or proton exchange across an open feature in a mask.
6. Overlay low index buffer layer 21, if necessary.
7. Photolithographically define electrodes 19 and 20. This may involve electroplating to bring the electrode to the desired thickness.

Figure 5:
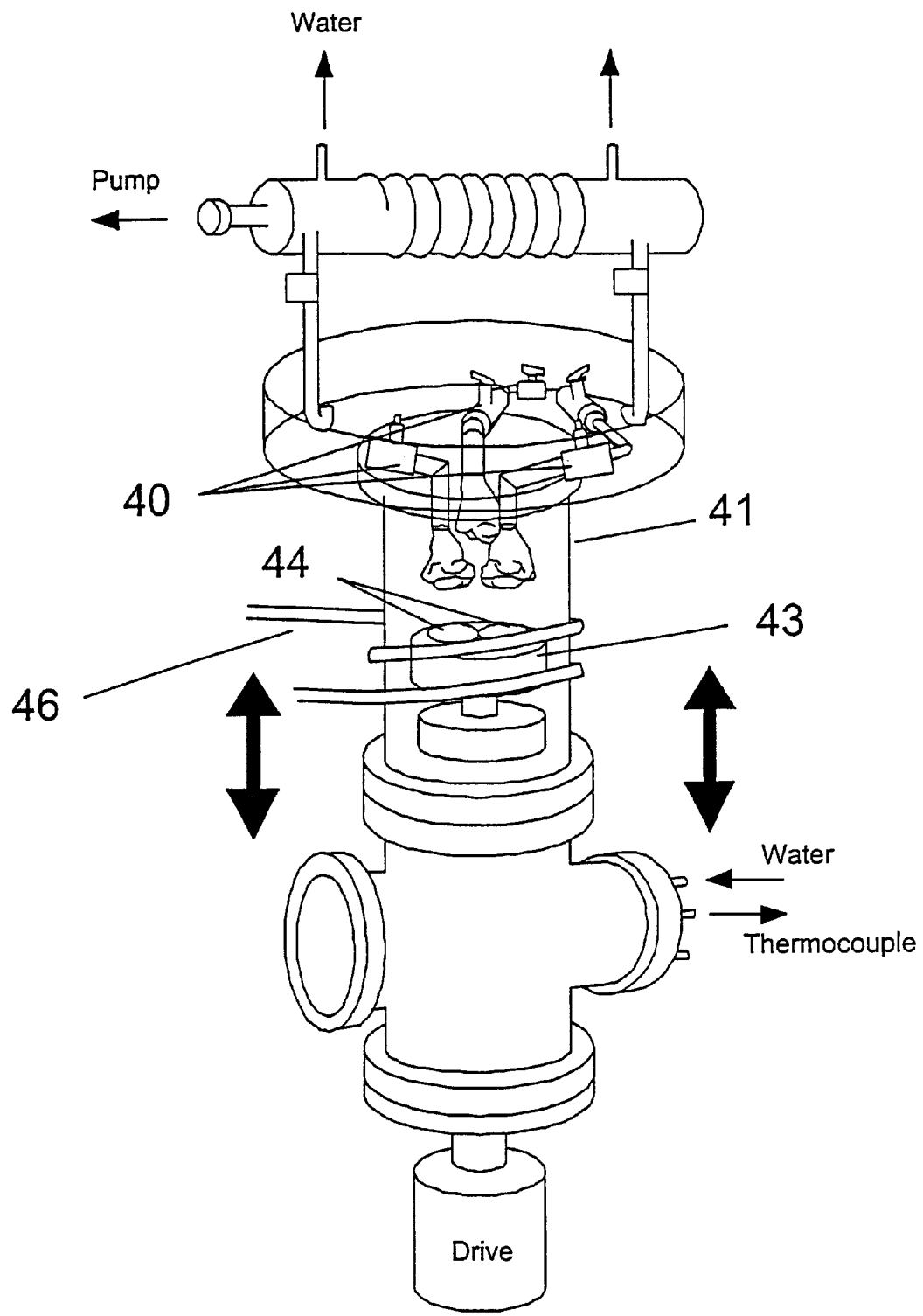
FIG. 5 is a schematic view of a low pressure thin film CVD reactor that may be utilized in carrying out the present invention.
Figure 6:
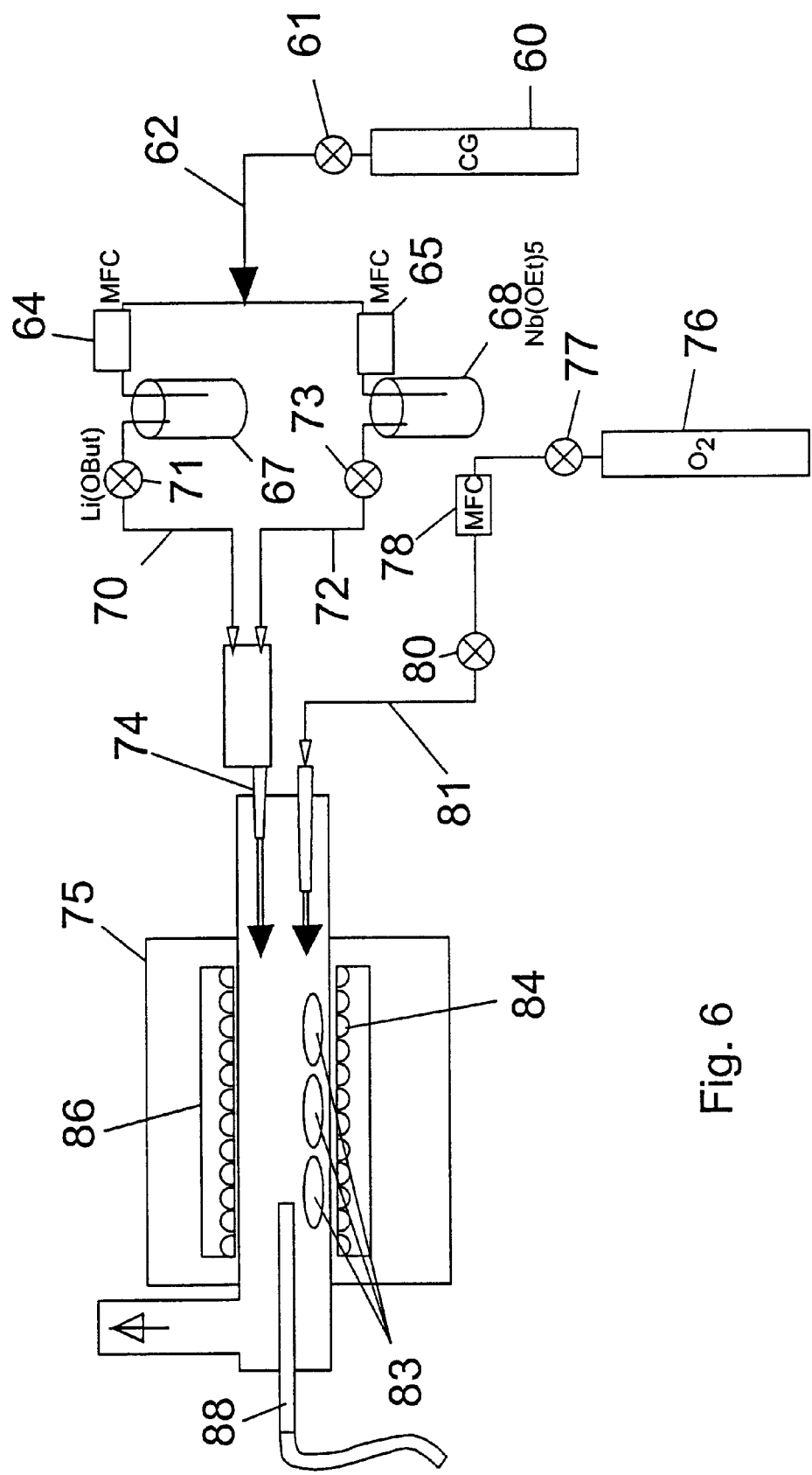
FIG. 6 is a schematic view of an atmospheric pressure CVD system that can be used for carrying out the present invention.

FIG. 5 is a diagram of a low pressure chemical vapor deposition (CVD) reactor that may be utilized in forming the layer 11, and FIG. 6 shows an atmospheric pressure CVD reactor that may be utilized. The reactor of FIG. 5 uses inductive heating via an external coil, whereas the reactor of FIG. 6 uses an external oven and/or may use a flammable gas to be burned with the injected precursors.

A first film exemplary growth process for the $LiNbO_3$ layer 11 is the following: A carrier gas (e.g., $N_2$), mixed with $O_2$ (e.g., 75% $N_2$, 25% $O_2$), is bubbled through precursor solutions containing metal alkoxides (e.g., lithium t-butoxide (Li-t-OBu), niobium ethoxide (NbOEt), or lithium-niobium ethoxide $(LiNb(Oet)_6)$. The solutions may be heated to enhance the volatilization of the solutions. The vaporized precursor is injected via nozzles 40 into a reactor tube 41, which has a substrate holder 43 that supports the substrate(s) 44 onto which the $LiNbO_3$ film is to be deposited. Precursor gas flow rates are controlled. Pressure in the reactor tube 41 is typically in the range between 0.1 Torr and atmospheric pressure. The whole tube 41 and its contents may be heated (e.g., via an oven), or the substrate 44 alone may be heated via an alternating electric field from a coil 46 coupled to a resistive substrate holder 43 (induction heating). The substrate holder 43 may be rotated to make the deposition more uniform. Growth of amorphous $LiNbO_3$ occurs typically in a temperature range at or below 600° C. Deposition rates are about 2 $\mu$m/h. Deposition rates can be increased by introducing active carrier gases such as trimethylcholorsilane to reduce concentration of gaseous components containing hydroxyl groups. The amorphous $LiNbO_3$ film etches at a rate of about 5 $\mu$m/min in an aqueous 25% solution of HF. The amorphous $LiNbO_3$ film is then annealed at 900° C.–1100° C. for several (e.g., 6) hours in a ceramic container with powdered $LiNbO_3$.

Previous chemical-based $LiNbO_3$ film growth has been limited to ~100 nm/h. The first process as discussed above carries out CVD growth at higher (near atmospheric) pressures to suppress the desorption processes responsible for poor growth rates, allowing growth rates ~2 $\mu$m/h to be attained. A second process, in accordance with the invention, is based upon an elucidation of the film growth chemistry, and uses a reactive carrier gas to modify the growth chemistry so as to increase growth rates. This second approach has several important consequences. Film growth experiments indicate that the addition of a common organic chlorinating agent, trimethylchlorosilane, $Me_3SiCl$, to the chamber along with the $Nb(OEt)_5$ precursor results in a doubling of the growth rate. Concommittant synthetic experiments have shown that $Me_3SiCl$ easily chlorinates $Nb(OEt)_5$ at room temperature, yielding mixed $Nb(OEt)_{5-n}Cl_n$ species, along with the volatile and stable silyl ether by-product, $Me_3SiOEt$. For example, a 1:1 mixture of $Nb(OEt)_5$ and $Me_3SiCl$ monitored by proton nuclear magnetic resonance (NMR) over 3 days reveals the gradual disappearance of peaks due to $Nb(OEt)_5$, and the appearance of peaks due to $Nb(OEt)_4Cl$: terminal $OCH_2CH_3$ 1.205 ppm, triplet, J=7.0 Hz; bridging $OCH_2CH_3$ 1.451 ppm, triplet, J=7.0 Hz; terminal $OCH_2CH_3$ 4.573 ppm, quartet, J=Hz; bridging $OCH_2CH_3$ 4.479 ppm, broad unresolved multiplet. Similarly, the $^{93}Nb$ NMR peak due to $Nb(OEt)_5$ decreases in intensity over the course of the reaction, while a peak at −1124 ppm (upfield from $[Et4N][NbCl_6]$), attributed to $Nb(OEt)_4Cl$, grows in intensity. The generation of the $Me_3SiOEt$ by-product is confirmed by the observation of $^1H$ peaks at 1.088 ppm (triplet, J=7.0 Hz, $CH_3$), 3.495 ppm (quartet, J=7.0 Hz, $CH_2$), and a singlet at 0.63 ppm ($SiMe_3$). These results reveal the facile, co-operative inter-ligand decomposition mechanism that is responsible for the higher growth rates observed in the presence of $Me_3SiCl$. Further work has shown that the kinetics of the precursor decomposition process, and the thermal stability of the intermediates, can be modulated by both the substitution number, n, and the nature of R in the generic intermediate $NbCl_{5-n}(OEt)_n$. For example, reaction of the frequently used Nb precursor $NbCl_5$ with ethanol in a 1:1 ratio at room temperature generated not the anticipated $NbCl_4(OEt)$, but the species $Nb(=O)Cl_3$ (identified by single crystal X-ray diffraction) and the volatile products HCl and ethyl chloride, EtCl (identified by gas phase infrared spectroscopy). Of utmost importance is that the volatile organic, ethanol, reacts readily at low temperatures to convert a Nb—Cl bond to a Nb= moiety, precisely the chemical film component desired for the formation of $LiNbO_3$ from $Nb_2O_5$. Again, the by-products, HCl and EtCl, are stable gases, easily removed from the film growth surface. Thus for the series $NbCl_{5-n}(OMe)_n$, ease of precursor decomposition decreases, and compound stability increases, with an increasing value of n. Expanding on these results we have found that the stability of $NbCl_{5-n}(OEt)_n$ likewise increases with n, and are on a whole significantly more stable than the ethoxide derivatives. For example, while for n=1, the ethoxide $NbCl_4(OEt)$ decomposes at room temperature, $NbCl_4(OMe)$ decomposes at about 75° C., and the methoxide $NbCl_2(OMe)_3$ is stable to over 170° C. Thus, any number of precursor-carrier gas combinations may be utilized, which are able to satisfy a large range of kinetic and thermodynamic film growth or processing requirements.

Structures made of materials with a different dielectric constant, such as $SiO_2$, can be overgrown with the amorphous $LiNbO_3$. The amorphous $LiNbO_3$ can then be crystallized by the aforementioned annealing process. Furthermore, amorphous $LiNbO_3$ can be grown and crystallized on either z-cut or x-cut $LiNbO_3$. $LiNbO_3$ can also be grown as a crystalline material on other substrates such as sapphire.

The lithium niobate film growth procedure by chemical vapor deposition at atmospheric pressure includes two steps: the first step—deposition of an amorphous lithium niobate film at a temperature at or below 600° C. and the second step—crystallization annealing at a temperature in the range from 900° C. through 1100° C. FIG. 6 illustrates a metal organic chemical vapor deposition (CVD) system that can be used for lithium niobate growth in accordance with this process. A carrier gas canister 60, typically containing a mixture of oxygen and nitrogen or helium (e.g., 23% oxygen, 77% nitrogen) is connected through a valve 61 and supply lines 62 to mass flow controllers 64 and 65. The mass flow controller 64 controls the supply of carrier gas to a precursor bubbler 67 for lithium t-butoxide (Li(OBut), and the mass flow controller 65 controls the supply of carrier gas to a precursor bubbler 68 for niobium ethoxide $(Nb(OEt)_5)$. An outlet line 70 with valve 71 from the bubbler 67 and an outlet line 72 with valve 73 from the bubbler 68 extend to a mixing zone 74 of the gas inlet system of the CVD furnace 75. Oxygen may also be supplied to the furnace from a canister 76 through a valve 77, mass flow controller 78, valve 80, and supply line 81. The substrates 83 to be treated are held on a substrate carrier 84 within a reactor enclosure 86 in the furnace. Alternatively, a radio frequency(RF) coil may be utilized, if desired, to inductively heat the substrates. A temperature sensor 88 (e.g., a thermocouple) is used to monitor the temperature adjacent the substrates 84. The delivery gas lines 70 and 72 preferably are always kept at a temperature over 150° C. to prevent deposition inside the lines, and bubblers 67 and 68 are heated to get the pressure of the precursors into the range of 0.1–1 Torr (e.g., 150° C. and 190° C. for niobium penta-ethoxide and lithium t-butoxide respectively.) The optimal flow rates are about 0.5 slpm. At these conditions the film deposition (growth) rate can be about 2 microns per hour or even higher (lower growth temperature results in higher growth rate). The films growing at the first step show different degrees of crystallinity depending on the growth temperature. Films grown at temperatures below 650° C. are an amorphous lithium niobate, and films grown at temperatures in the range from 700° C. to 900° C. are polycrystalline material. (Note that films grown even at 600° C. could be expitaxial—i.e., crystalline—if the growth rate is smaller than 0.2 microns per hour.) In accordance with the present invention, amorphous and polycrystalline lithium niobate are recrystallized by high temperature annealing (annealing temperature >900° C.). In contrast to the as-grown sample for which X-ray diffraction reveals featured polycrystalline arcs, annealed samples exhibit good crystal structure. This two-step growth method allows the growth of epitaxial lithium niobate films with a growth rate over 1 micron per hour. For comparison, crystalline lithium niobate films grown at temperatures >900° C. have growth rates below 0.1 micron per hour.

The following are examples of processes carried out with the atmospheric pressure CVD system of FIG. 6 to grow amorphous $LiNbO_3$ films. Substrates (~1 cm$^2$, c-cut $LiNbO_3$) were loaded into the horizontal reactor 86, which was heated in the furnace 75. Before growth the substrates were annealed at 1100° C. for 1 hour. Growth of amorphous films was typically carried out at ~650° C. Films were deposited from lithium t-butoxide and niobium ethoxide (maintained at 190° C. and 150° C., respectively). The delivery gas line was kept at 150° C. to prevent deposition inside the line. A carrier gas of 23% oxygen and 77% nitrogen was bubbled through the precursors at a flow rate ~0.5 slpm. Film growth rate and film crystallinity are highly dependent on reactor temperature. Under the conditions employed here, a growth rate of ~2 µm/h was observed at reactor temperatures between ~500° C. and 750° C. The chemical composition of the amorphous $LiNbO_3$ films was examined with Auger electron spectroscopy using films grown on (111) Si to obviate surface charging. No elemental carbon was detected in a typical film. The amorphous films were crystallized by annealing them in a closed ceramic container containing powdered $LiNbO_3$. To further insure an adequate lithium oxide pressure over the films, the samples were also covered with a bulk $LiNbO_3$ wafer segment. Annealing was performed for one hour at 900° C.–1100° C. Thickness measurements on patterned films were performed with a profileometer.

High growth rates or lower growth temperatures generate amorphous, as opposed to polycrystalline or epitaxial, lithium niobate films. Films grown between ~500°–650° C. were amorphous, as evidenced by a diffuse x-ray diffraction band overlaying weak diffraction peaks from the substrate. After a one hour post-growth anneal at 1100° C., X-ray diffraction scans using a 2-D X-ray detector and pole plots derived from them show the previously amorphous film grown at 650° C. to be single crystal. The single-crystal epitaxial nature of the annealed $LiNbO_3$ layer was confirmed by transmission electron microscopy (TEM) using a JEOL 2010F field emission transmission electro microscope operated at 200 kV. The cross-sectional TEM image of the $LiNbO_3$ layer after annealing taken under [2110] two-beam bright field conditions were consistent with single crystal structure. No interface between the film and the substrate, or associated defects, was visible under different sets of two-beam imaging conditions, consistent with a high quality crystalline film and intermixing at the interface. Analysis of selected area diffraction patterns (SADPs) obtained from different areas of the film only, and also form areas containing both the film and substrate, confirmed that $LiNbO_3$ film is epitaxial single crystal. The typical SADP taken from the same area containing both the film and the substrate consists of one set of spots and corresponds to the [0110] zone of the rhombohedral $LiNbO_3$ crystal structure with a=0.515 nm, c=1.386 nm, space group R3c (161). This SADP demonstrates that there is no difference in crystal structure, orientation or crystal quality between the $LiNbO_3$ film and substrate. The TEM analysis proved the high-quality crystallized $LiNbO_3$ layer to be free of segregations of a second phase and extended defects.

Films grown at higher temperatures (~700°–750° C.) exhibited diffraction rings in the x-ray spectra characteristic of polycrystalline films.

Advantage can be taken of the rigid etch rate of amorphous $LiNbO_3$ (~7 µm/min. in 4% HF at room temperature) to pattern the film before annealing to crystallinity, e.g., photolithographically patterning $HF:H_2O$ etching and then annealing the $LiNbO_3$ film. A non-optimized RIE etch using a $29:2::CF_4:O_2$ gas mixture and 50 W RF power was found to etch the amorphous $LiNbO_3$ about 20-fold faster than for crystalline or polycrystalline $LiNbO_3$ under the same conditions. The bulk film diffusion processes which occur at annealing temperatures during crystallization are found to be more effective than the surface mobility in altering the structure of the resulting film.

A lift-off technique may also be used in accordance with the invention to shape lithium niobate thin films. As an example, a photolithographically patterned $SiO_2$ mask atop a crystalline lithium niobate substrate was overgrown with polycrystalline lithium niobate, with the lithium niobate grown on the substrate where it is exposed by the patterned $SiO_2$. The $SiO_2$/lithium niobate mask was etched away in an aqueous HF solution, and the structure was annealed. The resulting patterned film, featured 1 µm thick by 40 µm wide single crystal $LiNbO_3$ ridges (as determined by x-ray diffraction). Lift-off processes are not often successfully applied to perovskite films because the high temperatures necessary for epitaxial perovskite growth typically induce reaction or interdiffusion of the oxide and the mask material. As the deposition of amorphous lithium biobate in the present process takes place at much lower temperatures than epitaxial growth, mask-oxide interactions are generally less of an issue, and lift-off processes can be used as patterning technique.

Various precursors may be used in the processes in accordance with the invention. These include, for example, niobium penta-alkoxides (e.g., methoxides, ethoxides, iso-propoxides) and lithium-niobium alkoxides (e.g., methoxides, ethoxides, and iso-propoxides).

As noted above, amorphous lithium niobate has a much higher etching rate for wet etching with common liquid etchants such as HF acid, as well as for dry etching with a $CF_4:O_2$ mixture. In both cases the etching rate can be higher than 2 microns per hour (for comparison, the wet etching rate of crystalline and polycrystalline lithium niobate is below 0.1 micron per hour), permitting the practical development of planar technology in lithium niobate devices.

A suitable laser, as discussed below, can be used to machine trenches in lithium niobate films and bulk wafers. In an example of a laser ablation apparatus, a laser provides an output beam that is deflected by a 45° angle mirror that is highly reflective to the wavelength of the light from the laser. The deflected beam can optionally be passed through a mask having a mask opening therein, or passed directly without the use of a mask to a lens that focuses the beam into a precisely defined beam which impinges upon a lithium niobate substrate, e.g., a $LiNbO_3$ film or bulk crystalline $LiNbO_3$, having a surface. The substrate can be mounted on a stage which is translatable in x, y and z directions so that the substrate and the beam can be translated with respect to each other to cut a trench having a desired pattern (e.g., a straight line, s-curve, etc.). Alternatively, the beam can be deflected with respect to the substrate to provide relative translation, for example, by using y and x scanning mirrors similar to those used in, e.g., laser scanning confocal microscopes. In addition, the substrate may be photolithographically patterned with a mask, made of a highly reflecting material such as a metal or an oxide or of an absorbing material such as a photoresist. Windows in the mask material may be utilized to define narrower etched features than might be achieved with a beam alone. A preferred laser ablation source provides an output beam at a wavelength above about 310 nm and below about 370 nm, preferably at about 355 nm. The laser provides pulses of selected duration of a few tens of nanoseconds, e.g., 40 ns pulses, and preferably with a selectable pulse repetition frequency less than about 2000 Hz and selectable energy per pulse. An appropriate laser for use in machining lithium niobate is a frequency tripled, Q switched Nd:YAG (neodymium:yttrium-aluminum-garnet) laser providing a 40 ns pulse output with a wavelength at 355 nm that is near to but above the absorption edge of lithium niobate. A 355 nm (3.5 eV) wavelength is preferred because it is above the absorption edge of congruent LiNbO3, but is partially absorbed by the lithium niobate substrate. The use of this wavelength can produce a more refined ablation process than wavelengths below the absorption edge as used in conventional laser ablation techniques, resulting in smoother walled LiNbO3 trenches. Applying laser pulses at wavelengths above the absorption edge, but which are still partially absorbed by the material, is found to result in ablation of trenches having smoother walls than generally obtained with lasers at wavelengths that are more fully absorbed by the material.

This ablation process is facilitated by the fact that $Li_2O$ will diffuse out of $LiNbO_3$ on heating, and that lowering the Li/Nb ratio shifts the absorption edge to longer wavelengths (by about 15–20 nm), which is sufficient to greatly increase the energy absorption. See, Kovacs, et al., App. Phys. Lett., Vol. 70, 1997, pp. 2601 et seq. A likely sequence is that localized heating from the beam causes local surface depletion of $LiO_2$, followed by locally higher absorption, resulting in ablation (melting and vaporization/sputtering) of a thin layer, which exposes a layer below it in which the process is repeated. It is also noted that because $LiNbO_3$ is an insulator, there are virtually no free electrons in the conduction band at room temperature. Because the energy of the irradiating light beam (e.g., 355 nm, corresponding to 3.5 eV) is less than the band gap of $LiNbO_3$ (4 eV), no electron-hole pairs are produced in the bulk material.

However, single photons can create electron-hole pairs at defect and surface states. Incident laser radiation on the surface of the $LiNbO_3$ will be absorbed, creating many more electron hole pairs near the surface than in the bulk. The electron hole pairs will recombine nonradiatively and heat the surface layer. Heating further reduces the bandgap near the surface, resulting in more absorption. This process will continue, resulting in rapid heating of the surface layer followed by melting and eventual vaporization or sputtering of the surface $LiNbO_3$. During a relatively short duration pulse (e.g., 40 ns), surface layers are continuously removed while the bulk material is left unharmed. The result is a trench in the $LiNbO_3$ with smooth surfaces.

Low pulse repetition rates (a few kHz and preferably about 1 kHz) combined with long pulses (about 40 ns) with energies in the range of 50–250 $\mu$J are found to be an effective and controlled way to ablate trenches in $LiNbO_3$. Under such conditions, a single scan will ablate away about 5–25 $\mu$m of material in a trench, depending on the energy in each pulse. Since a low repetition rate is used, the $LiNbO_3$ substrate will have time to return to its equilibrium temperature before the next pulse arrives. Therefore, thermal damage is minimized near the ablation area.

Two examples of sets of parameter values that were used to produce trenches in $LiNbO_3$ with very smooth surfaces and straight sidewalls are listed below. The laser used was a Coherent Avia 1.5 W frequency tripled Q-switched Nd:YAG laser, and the substrate was mounted on a commercial xyz translator from Newport Co. with a programmable driver (ISP 300).

Trench 1
Wavelength=355 nm
Energy/40 ns pulse=54 $\mu$J
Average Power=50 mW
Repetition Rate=1000 Hz
Stage Velocity=0.25 mm/s
Beamwaist location=0.305 mm above the $LiNbO_3$ surface
Trench 2
Wavelength=355 nm
Energy/40 ns pulse=80 $\mu$J
Average Power=80 mW
Repetition Rate=1000 Hz
Stage Velocity=0.25 mm/s
Beamwaist location=1.220 mm above the $LiNbO_3$ surface Under the foregoing condition, trenches with depths ranging from 5 $\mu$m to 30 $\mu$m and widths from 20 pm to 30 $\mu$m can be produced.

A preferred embodiment of a traveling wave modulator (TWM) in accordance with the invention requires the simultaneous optimization of three interrelated performance parameters: bandwidth ($f_{3\ dBe}$), drive voltage ($V_{3\ dBe}$), and impedance (Z). Maximum bandwidth is obtained when the microwave and optical fields are velocity matched, or $\Delta N = N_m - N_0 = 0$. This condition and the requirement that the device impedance be well matched to the drive electronics (i.e., $Z=50\Omega$), uniquely specifies the electrode capacitance in the absence ($C_0$), and in the presence ($C_m$), of surrounding matter (i.e., the $LiNbO_3$ substrate and any buffer layer). For $\Delta N=0$ and $Z=50\Omega$, $C_0=31$ pF/cm$^2$ and $C_m=144$ pF/cm$^2$. The third performance parameter, drive voltage ($V_{3\ dBe}$), is controlled by the optical/microwave fields overlap ($\Gamma$), and the electrode loss ($\alpha$).

To reiterate, the three electrical parameters, impedance, drive voltage, and bandwidth (Z, $V_{3\ dBe}$, $f_{3\ dBe}$) are controlled by four geometric parameters ($C_o$, $C_m$, $\Gamma$, $\alpha$). These four geometric parameters are in turn controlled by the fabrication parameters, electrode height and width ($t_e$, $w_e$), inter-electrode gap (G), buffer layer thickness ($t_b$), and trench depth and width (d,w), Viz., $$(Z, V_{3dBe}, f_{3dBe})$$
$$\uparrow$$
$$(C_o, C_m, \Gamma, \alpha)$$
$$\uparrow$$
$$(t_e, w_e, G, t_b, d, w)$$

In the design of conventional TWMs, i.e., those fabricated on a uniform LiNbO$_3$ substrate, control of the electrode geometery and the buffer layer thickness are insufficient to permit optimization of all four physical parameters ($C_o$, $C_m$, $\Gamma$, $\alpha$): these parameters are interrelated so that changing one changes the others. This problem is exacerbated at higher bandwidths. Noguchi, et al. (J. of Lightwave Technol., Vol. 13, pp. 1164–1168, and J. of Lightwave Technol., Vol. 16, pp. 615–619), have shown that three of the four parameters, $C_o$, $C_m$, and $\alpha$, can be optimized by (a) increasing the electrode thickness to reduce $\alpha$, (b) increasing the inter-electrode gap to offset the increase in $C_o$, and (c) removing about 3.6 μm of LiNbO$_3$ from the surface between the electrodes (the so-called ridge structure) to compensate for the too-large value of $C_m$.

The ridge structure, in effect, provides one additional tuning mechanism (i.e., the choice of depth of the ridge) among the parameters, $C_o$, $C_m$, and $\alpha$. It would be very desirable to also improve the overlap, $\Gamma$, without degrading the other parameters. It has been determined in accordance with the invention that a properly positioned slot or trench of correct width, w, and depth, d, provides the additional degree of freedom necessary to optimize all four physical parameters, $C_o$, $C_m$, $\Gamma$, and $\alpha$.

Model calculations show that a TWM based on a planar geometry and optimized for velocity match between the microwave/optical fields ($\Delta N \sim 0$) and Z=48Ω, using $t_{tb}$=1.5 μm, we=8 μm, te=20 μm, G=34 μm, L=4 cm, and $\alpha$=0.55 f$^{1/2}$, has a drive voltage of $V_{3\ dBe}$=6 volts. Using a 3 μm deep ridge will reduce this voltage to 5 volts. Replacing the ridge in accordance with the invention with a pair of trenches 12 μm deep by 14 μm wide, positioned 3 μm from the edge of the optical waveguides, will further reduce the required drive voltage to 4 volts.

Figure 7:
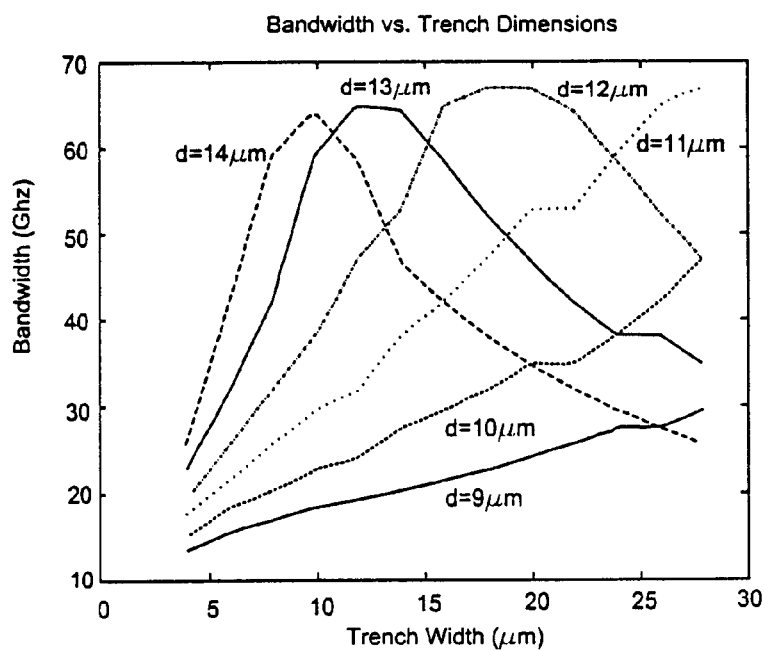
FIG. 7 are plots of bandwidth versus trench (slot) width for several trench depths.
Figure 8:
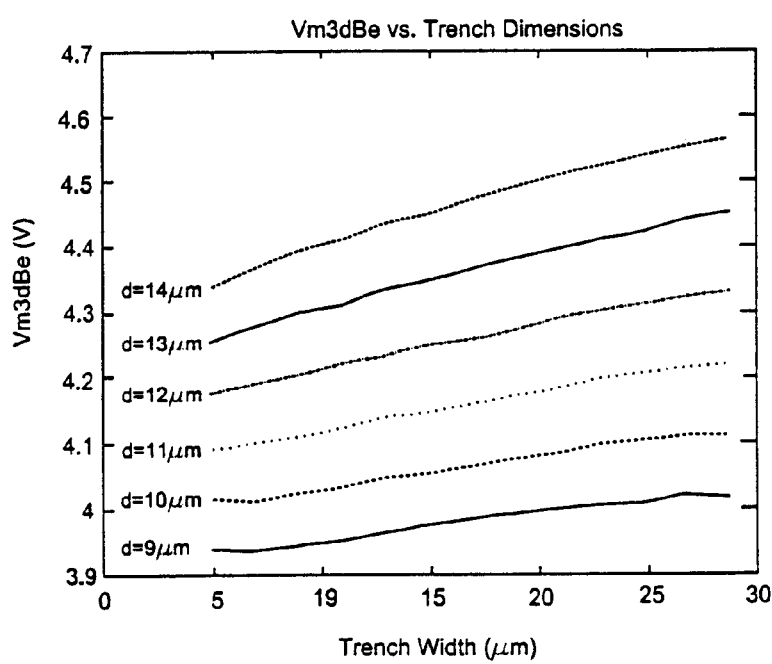
FIG. 8 are plots of operating voltage versus trench (slot) width for several trench depths.

The calculated results are based on a series of design curves, which relate the trench dimensions to the drive voltage and bandwidth. A typical set of curves is shown in FIGS. 7 and 8. These curves are calculated for symmetric coplanar electrode structures, with a gap of 34 μm between the electrodes 19 and 20, and two trenches, each of depth, d, and width, w, placed 3 μm away from a center electrode. The electrode height is 30 μm and the buffer layer thickness is 0.5 μm. The curves are used as follows:

1. Choose a minimum bandwidth and use FIG. 7 to determine the range of trench depths. For BW=40 GHz, 10≦d≦14 μm.
2. Noting from FIG. 8 that the lowest operating voltage is achieved with the smallest value of d; also, for a given d, the operating voltage decreases with decreasing width. Therefore, choose the minimum depth, d=10 μm. Its corresponding minimum trench width from FIG. 7 is w=25 μm.
3. Given d=10 μm and w=25 μm, the minimum operating voltage, read from FIG. 8, is $V_{3\ dB}$=4.1 V.

Figure 9:
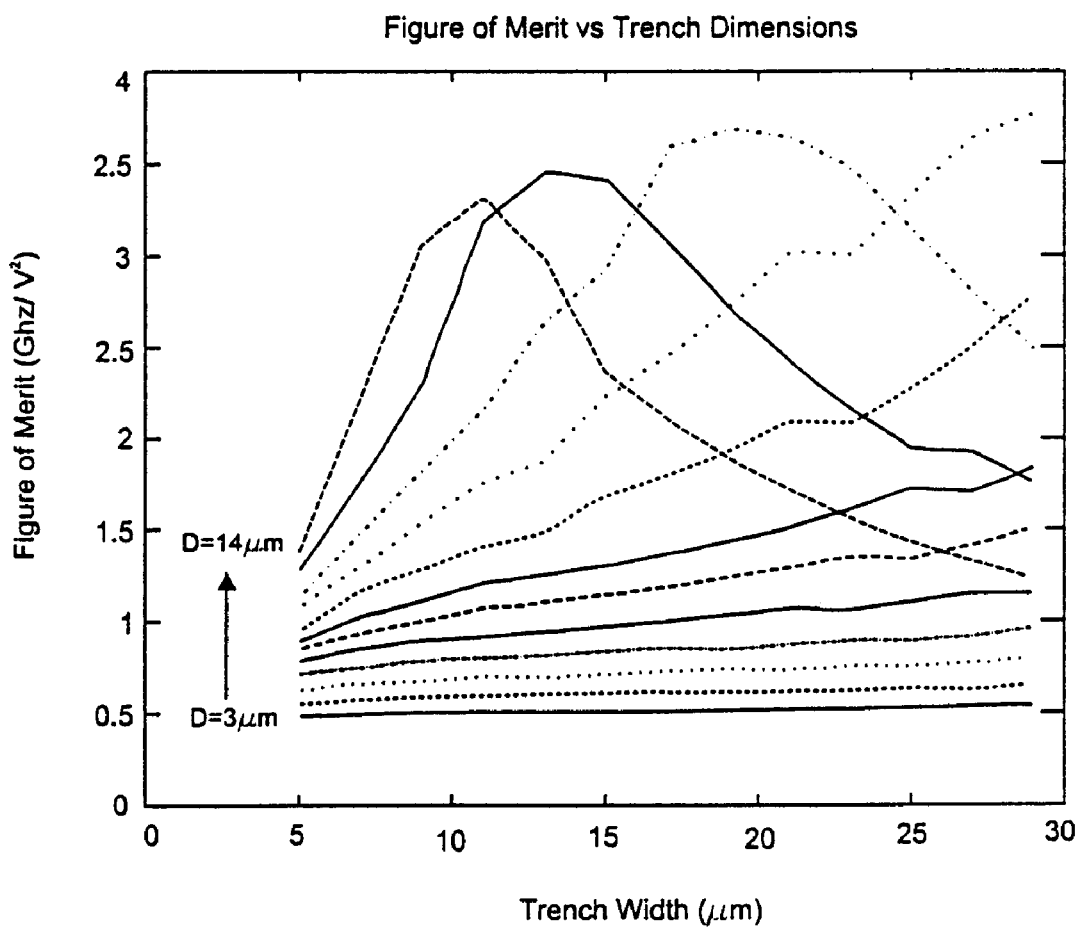
FIG. 9 are plots of figure of merit versus trench dimensions, with each graph line representing a different depth from d=3 $\mu$m to d=14 $\mu$m in increments of trench depth increase of 1 $\mu$m.

FIG. 9 is a graph of the figure of merit vs. trench dimensions. The figure of merit is defined at the bandwidth/ (Vm3 dBe)$^2$ [in GHZ/V$^2$]. The figure of merit can also be described by its inverse, which is proportional to the modulator's switching energy. A large figure of merit implies a lower switching energy, and therefore a more efficient device. FIG. 9 emphasizes that the figure of merit is dependent on the choice of the trench width for a given depth. The trench width is an important tuning parameter in improving the performance of the modulator.

TABLE 2

| Bandwidth | Trench depth × width | Minimum Vm3dBe |
|---|---|---|
| 10 | 6 × 6 | 3.79 |
| 20 | 8 × 22 | 3.89 |
| 30 | 9 × 28 | 4.02 |
| 40 | 10 × 26 | 4.12 |
| 50 | 11 × 18 | 4.17 |
| 60 | 11 × 24 | 4.21 |

Additional slots may be introduced after fabrication as a way of performing post-process tuning of the device. The trenches or slots formed in accordance with the invention allow tradeoffs of width and depth that cannot be obtained with a ridge structure. A ridge structure has a fixed width. A trench structure is one that allows adjustment of the width and depth to optimize the electrical and optical parameters of the TWM. By adding an independent parameter, the width of the trench, it is possible to optimize multiple parameters. In addition, there are processing advantages of narrow trench geometries. By trading depth for width, it is possible to increase the distance of "offset" between waveguide and the trench wall—thereby relaxing mask alignment tolerances and reducing the risk of scattering loss from the trench wall. Further, a trench with width some 6 μm smaller than the electrode gap relaxes some of the processing tolerances. For example, a properly chosen depth and width will result in $N_m$=$N_o$, Z~50Ω, nearly irrespective of the height of the electrodes (10–30 μm).

It is expected that "planarization" will be difficult when plating electrodes onto the top of tall ridge waveguides. That is, it may be difficult to photolithographically fabricate the waveguides and electrodes when the trench width is large. Narrow trenches in accordance with the invention can avoid these difficulties.

Figure 10:
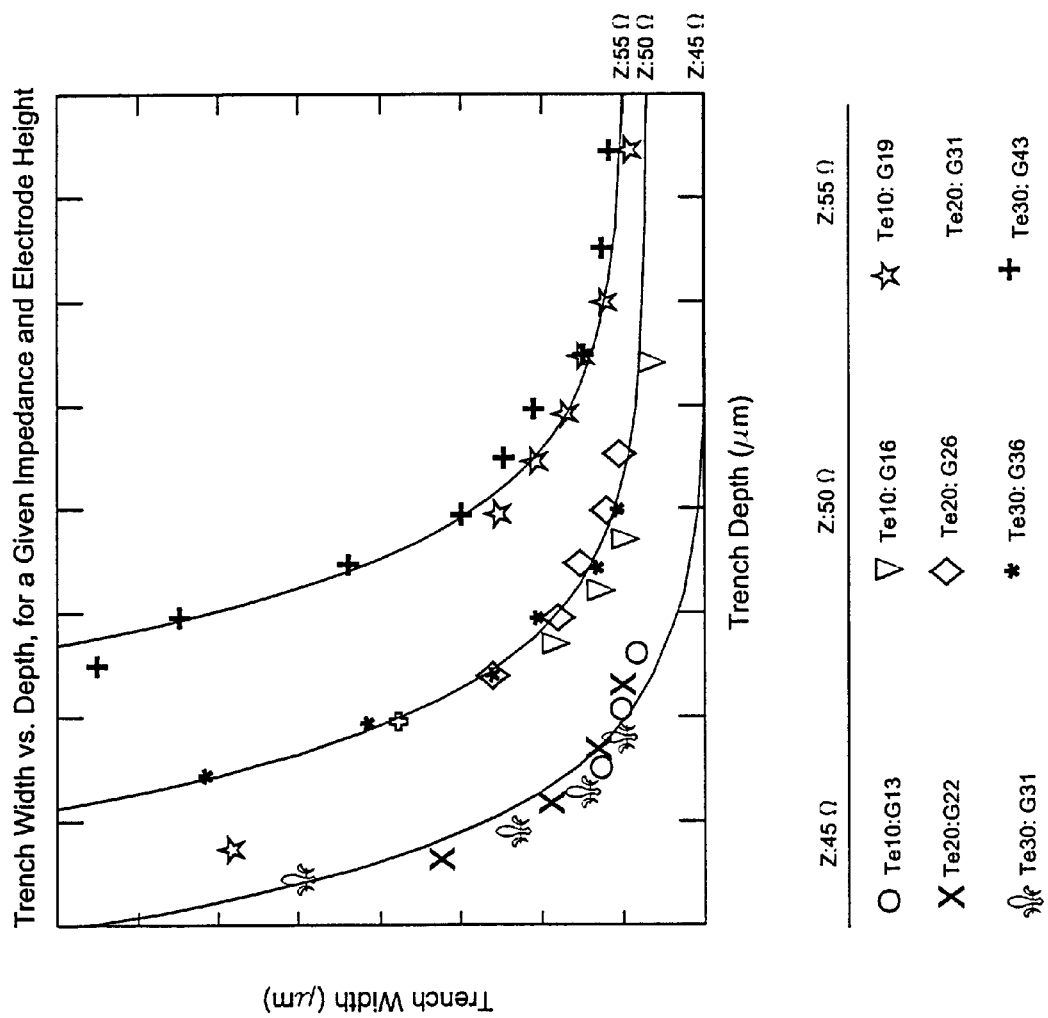
FIG. 10 are plots showing trench width versus depth for a given impedance and electrode height.

Both the depth and the width of the trenches greatly influence the electronic and optical properties of TWM. For the case of perfect phase matching between the RF and optical waves, there is a clear relation between the two. FIG. 10 shows the relation between the trench width and depth for perfect velocity matching ($N_m$–N=0), a 0.5 μm buffer layer (optimal), and a 50Ω impedance. The calculations were performed for three electrode heights (Te-10, 20, 30 μm) and were repeated for Z=45 and 55Ω.

It is seen from FIG. 10 that the width is a strong function of the depth and characteristic impedance, and independent of electrode height. (The electrode height does, however, determine the electrode gap, the distance between the edge of the electrode and the closest edge of the trench, which places an upper limit on the trench width). As a practical example, the 50Ω design curve in FIG. 10 shows that a trench pair with a depth=14 μm and a width=10 μm will provide a 50Ω impedance and near perfect velocity matching for all three electrode heights. This means that multiple electrode geometries could be manufactured using a single trench design.

The curves of constant impedance can be approximated as follows:

Z=45Ω: w=2144*exp(−d/2)+0.187

Z=50Ω: w=6398*exp(−d/2)+3.853

Z=55Ω: w=29386*exp(−d/2)+5.203

Thus, a trench, defined by the parameters derived from FIG. 10 or the equations above, can produce essentially perfect velocity matching for impedances in the range of 45–55Ω, and electrode heights 10–30 μm.

More generally, for selected impedance levels, the relationship between the width and the depth of the trenches to obtain desired impedance levels will be related in accordance with the equation:

$$w = K_1 \exp(-d/2) + K_2,$$

where $K_1$ and $K_2$ are constants. The constants $K_1$ and $K_2$ are a function of the selected impedance level, and can be determined from a graph such as FIG. 10.

The appropriate selection and positioning of trenches in accordance with the invention, that may be formed as discussed above, allow improvements in various devices and integrated optics.

As discussed above, amorphous lithium niobate can be photolithographically patterned and crystallized to produce ridges and trenches in a lithium niobate surface to confine radio frequency (RF)/microwave and optical fields. In addition, the selective introduction of trenches, filled either with air or a material of a different dielectric constant, can be used to modify electromagnetic properties such as the effective indices and group velocities of light fields and RF/microwave fields. Properly placed trenches can be used to confine the RF/microwave fields of the electrodes on a traveling wave electro-optical modulator, and to alter the effective index of the RF/microwave traveling wave to better match that of the optical field.

In addition, optical fields can be better confined by replacing conventional diffused optical waveguides with doped guides. In particular, a graded dopant concentration (e.g., titanium as the dopant), can be introduced into the growing film, for example, with the largest doping in the center of the thickness of the film. The vertical mode profile can be controlled by the doping profile of the dopant (e.g., Ti), while lateral confinement is provided by the lithium niobate/air interface at the edge of the waveguide where the film layer has been etched away, as illustrated by the waveguide section 28 bounded by the trenches 24 and 25 of the structure of FIG. 4. If desired, the trenches 24 and 25 could be effectively expanded in width to leave a fully isolated ridge waveguide. The waveguide is defined by the etched away regions of the layer of lithium niobate to form sidewalls of the waveguide 28 that laterally confine the light. Because of the ease of etching amorphous lithium niobate, it is possible to make smooth vertical walls which are essential to very low loss waveguides. The strong lateral confinement allows waveguides with bends in them which may have smaller radiuses of curvature than are now possible. For example, a typical prior diffused waveguide 1 mm long with a 5 mm radius has about 10 dB excess loss. See, S. K. Korotky, et al., "Ti:LiNbO$_3$ Integrated Optics," pp. 217–219 of Integrated Optical Circuits and Components, L. Hutcheson Ed., Dekker Press, 1987. In addition to permitting small radius "s" bend offsets (which are presently typically about 3 mm long for a 50 μm offset), the waveguides in accordance with the invention may be utilized in rings to make ring resonators. Ring resonators can be used as frequency selective filters. By adding a gain material such as Er$^{3+}$ through the waveguide and optically pumping it, this structure can be utilized as a waveguide laser. Because of the large radius of curvature required to keep losses low, integrated optic devices using ring elements are not now practical.

A variety of other integrated optic devices can incorporate the present invention to control the electric and optical field position as well as the associated effective indices.

As indicated above, the present invention may be incorporated in traveling wave modulators. The trench(es) as formed in accordance with the invention can be used to control the RF/microwave field lines by using the lithium niobate/air boundary to inhibit the spreading of the RF/microwave field, creating a better overlap between it and the optical field, and with proper placement, an air/lithium niobate boundary can be made to refract the RF/microwave field lines to bend them to better overlap the optical fields. The group velocity of a propagating RF/microwave field can be increased to better match that of the optical field by causing the field lines to cut through segments of low index material. In the conventional traveling wave modulator (TWM) structure, the SiO$_2$ buffer layer between the electrodes and the lithium niobate surface serves this purpose. However, it also places a greater distance between the electrodes and the optical waveguides, potentially reducing the efficacy of the electrodes. Ridge waveguide structures can be used to better laterally confine the optical field than is possible with diffused waveguides in conventional TWMs. This reduces the elliptical shape of the optical mode, making a better match of its mode profile to that of the input and output optical fibers. The use of a trench between the two arms of the Mach-Zhender interferometer allows the two arms to be brought closer together without coupling. The angle between the two y-branches may then be made significantly smaller, reducing the associated loss. For example, the excess loss at a y-branch is about 1 dB with a 0.5 degree branch and about 3 dB with a 1 degree branch for Ti-diffused lithium niobate waveguides.

The invention may also be incorporated in polarization rotators and polarization scramblers. In such devices, the optical pulses that are launched on a fiber begin as linear polarized light. Local thermal gradients and mechanical stresses along the fiber cause the fiber to become birefringent in those regions. The result is that the state of polarization (SOP) of the light varies from point to point along the fiber and also changes with time. The SOP can be represented by two mutually perpendicular sinusoids with different amplitudes and with some phase relation between the two. As a consequence of the time varying and position varying SOP, any device inserted into the fiber span which does not affect the two polarization components equally (e.g., splices and connectors, fiber amplifiers, taps, etc.) will cause the light received at the end of the span to change with time. Unless carefully compensated, the fiber optic system will therefore exhibit slowly varying time dependent gain or loss.

A second problem, polarization mode dispersion (PMD), arises because of this same distributed birefringence along the fiber. Because the effective index averaged along the length of the fiber need not be the same for the two polarizations (due to mechanical and thermal stresses), the group velocity of the two polarization components of a light pulse will be different. The result is that the two polarization components of the light pulse will separate (i.e., polarization mode dispersion (PMD) will occur). The consequence is that the detected pulse will appear broadened, or in the extreme, appear as two individual pulses. Because the SOP along the fiber changes with time, the degree of PMD will also change with time. PMD has been shown to be a serious problem at transmission rates above 10 Gb/S.

One solution would be to alter the SOP as needed. The electro-optic effect can also be used to rapidly alter the birefringence of lithium niobate. Such devices can be used to rapidly transform or scramble the SOP, causing the polarization dependent effects to be averaged over all polarization states. See, F. Heismann, et al., "Lithium Niobate Integrated Optics," Chp. 9 in Optical Fiber Telecommunications IIIB, Kaminow & Koch, Eds., Academic Press, 1997. A fast polarization transformer has several other applications. Such a device can be used to transform the fiber's slowly varying SOP into a preferred SOP for polarization-sensitive optical components such as optical switches. In another application, two orthogonal (and therefore independent) polarization components may be launched into a fiber with each carrying its own digital information (i.e., polarization multiplexing). At the receiver, a polarization transformer reestablishes the original SOP so that the two signals can be separated (demultiplexed). The material of choice for use in polarization transformers and scramblers is lithium niobate. To properly transform any input polarization to any output SOP requires a minimum of three elements, although these devices have as many as eight electro-optic elements (an example is the JDS Uniphase polarization scrambler). These devices use a weaker electro-optic coefficient than a TWM, and therefore require a higher drive voltage, typically about 50 volts. See Heismann, et al., supra. As a result, such devices are difficult to drive with conventional digital electronics and the speed at which the SOP can be altered is limited. In accordance with the invention, field optimized waveguides and related features can be used, as in a traveling wave modulator, to reduce the operating voltage significantly, typically at least one-half.

Other devices which may take advantage of the optical and RF/microwave field optimizations include the lithium niobate electro-optic switch (and integrated arrays of switches). These devices use the electro-optic effect to change the propagation constant of a guided mode in either the directional coupler (the directional coupler switch) or in a tapered y-branch (the digital switch). Ridge waveguides and trench structures can be used to concentrate the applied electric fields, and arrays of these devices can be more densely integrated because the strong optical confinement inherent to ridge waveguides permits shorter s-bend interconnects.

Lithium niobate surface acoustic wave (SAW) filters are widely used as electrical filters in televisions and cell phones. Acousto-optic (AO) devices rely on electrically generated acoustic waves to deflect and frequency-shift light. Applications include ad/drop devices for wavelength division multiplex (WDM) fiber optic systems. Both SAW and AO devices require large RF/microwave powers to excite the surface waves on lithium niobate. The trench and ridge structures formed in accordance with the invention may be used to laterally confine the RF/microwave radiation, greatly increasing efficiency.

Photonic crystals are being considered for use in very dense integrated optical devices. Research today has focussed on fabricating photonic crystals in optically linear materials such as silicon and $SiO_2$. Generally, fabrication of photonic crystals has not been done in non-linear material on a scale (about 500 nm periodicity) that is necessary to take advantage of both the linear and non-linear effects. The combined use of linear photonics structures (such as defect waveguides) with non-linear periodic structures has not been studied in any detail. The additional Bragg momentum of the linear component may be utilized to provide new phase-matching conditions for the periodically distributed non-linearity. The linear aspect of these photonic crystals can allow for very compact waveguides and resonator structures by intentionally introducing defects. The extremely small cross-sections of these guides can greatly improve the conversion efficiency of optical non-linearities, which scale with optical power density. In addition, the use of defects in photonic crystals can be utilized to enable non-linear optical processes that cannot be carried out in a bulk material.

As noted, direct write electron beam and anisotropic dry etching lithographic techniques which have been developed for linear photonic crystals in semiconductors may not be applicable to crystalline lithium niobate. Because lithium niobate is an insulator, direct write is difficult, and lithium niobate is very resistant to wet or dry etching. The present invention allows deposit of an amorphous form of lithium niobate on a lithium niobate substrate that can be easily etched using wet or dry techniques, and which can be crystallized under the proper annealing conditions. This capability, together with the ability to reversibly raise the conductivity of lithium niobate by annealing it under an inert gas, can be utilized to write submicron features in lithium niobate thin films.

It is understood that the invention is not limited to the embodiments set forth herein as illustrative, but embraces all such forms thereof as come within the scope of the following claims.

What is claimed is:

1. A lithium niobate optical element comprising:
   (a) a substrate;
   (b) a layer of crystalline lithium niobate on the substrate formed from amorphous lithium niobate grown on the substrate and crystallized by annealing, the layer having a thickness of at least two $\mu$m; and
   (c) at least one trench in the layer of lithium niobate which is at least one $\mu$m deep.

2. The optical element of claim 1 further including a layer of dielectric material over the layer of lithium niobate.

3. The optical element of claim 2 wherein the layer of dielectric material is formed of $SiO_2$.

4. The optical element of claim 1 further including a material filling the trench which has a dielectric constant differing from the layer of lithium niobate.

5. The optical element of claim 4 wherein the material filling the trench is $SiO_2$.

6. The optical element of claim 4 including crystalline lithium niobate grown over the material filling the trench.

7. The optical element of claim 1 wherein the substrate is crystalline lithium niobate.

8. The optical element of claim 1 wherein the layer of lithium niobate has a selected dopant therein.

9. The optical element of claim 8 wherein the dopant concentration is graded over the thickness of the layer.

10. A traveling wave electro-optical modulator comprising:
    (a) a layer of crystalline lithium niobate having a thickness of at least two $\mu$m;
    (b) a waveguide formed in the layer of lithium niobate having an input path, first and second arms that split from the input path, and an output path, the first and second arms coupled to the output path;
    (c) electrodes above arms of the waveguide in the layer of lithium niobate; and
    (d) at least one trench in the lithium niobate layer adjacent the first arm and at least one trench in the lithium niobate layer adjacent the second arm, the trenches being at least one µm deep.

11. The modulator of claim 10 further including a layer of dielectric material between the layer of lithium niobate and the electrodes.

12. The modulator of claim 11 wherein the layer of dielectric material is formed of $SiO_2$.

13. The modulator of claim 10 further including a material filling at least one of the trenches which has a dielectric constant differing from the layer of lithium niobate.

14. The modulator of claim 13 wherein the material filling the trenches is $SiO_2$.

15. The modulator of claim 13 including crystalline lithium niobate grown over the material filling the trench.

16. The modulator of claim 13 wherein an electrode extends over the trench having the material filling the trench.

17. The modulator of claim 10 wherein the layer of lithium niobate is formed on a substrate of crystalline lithium niobate.

18. The modulator of claim 10 wherein the layer of lithium niobate is a substrate of crystalline lithium niobate.

19. The modulator of claim 10 wherein the width w of the trench and the depth d of the trench are selected to provide a selected impedance in accordance with $w = K_1 \exp(-d/2) + K_2$, where $K_1$ and $K_2$ are constants based on the selected impedance level.

20. The modulator of claim 19 wherein the selected impedance is Z=45 ohms, and $K_1$=2144 and $K_2$=0.187.

21. The modulator of claim 19 wherein the selected impedances is Z=50 ohms, and $K_1$=6398 and $K_2$=3.853.

22. The modulator of claim 19 wherein the selected impedance is Z=55 ohms, and $K_1$=29386 and $K_2$=5.203.

23. The modulator of claim 10 wherein the layer of lithium niobate and the trenches in the layer of lithium niobate are at least 5 µm deep and wherein the trenches are spaced at least 2 µm away from the most adjacent electrode.

24. The modulator of claim 10 wherein the depth d of the trenches is in the range of about 9 µm to about 14 µm and the layer of lithium niobate is at least as deep as the trenches, and wherein the width of the trenches is in the range of about 5 µm to about 30 µm.

25. The modulator of claim 24 wherein for a selected bandwidth of the modulator in the range of about 10 to about 65 GHz and a selected drive voltage $V_{m3\ dBe}$ of the modulator in the range of about 3.9 V to about 4.6 V, the depth and width of the trenches are selected in accordance with FIGS. 7 and 8.

26. The modulator of claim 10 wherein there is a trench in the lithium niobate layer adjacent each side of the first arm and a trench in the lithium niobate layer adjacent each side of the first arm and a trench in the lithium niobate layer adjacent each side of the second arm, the trenches positioned about 3 µm from an edge of the adjacent waveguide arm and having a depth of about 12 µm and a width of about 14 µm, the modulator having an impedance z of about 50 ohms.

27. An optical waveguide structure comprising:
(a) a substrate;
(b) a layer of crystalline lithium niobate formed on the substrate, the layer having a thickness of at least two µm; and
(c) a waveguide formed in the layer of lithium niobate defined by etched away regions of the layer of lithium niobate to form side walls of the waveguide, the waveguide having a height of at least one µm.

28. The waveguide structure of claim 27 including an electrode above the waveguide in the layer of lithium niobate.

29. The waveguide structure of claim 27 further including a layer of dielectric material between the layer of lithium niobate and the electrode.

30. The waveguide structure of claim 28 wherein the layer of dielectric material is formed of $SiO_2$.

31. The waveguide structure of claim 27 wherein the substrate is crystalline lithium niobate.

32. The waveguide structure of claim 27 wherein the waveguide in the layer of lithium niobate has a selected dopant therein.

33. The waveguide structure of claim 32 wherein the dopant concentration is graded over the thickness of the layer.

34. The waveguide structure of claim 27 wherein the layer of lithium niobate is formed from amorphous lithium niobate grown on the substrate and crystallized by annealing.

* * * * *